Oct. 1, 1968 V. J. LUNDELL 3,403,802
FARM TRACTOR
Filed Feb. 14, 1966 7 Sheets-Sheet 1
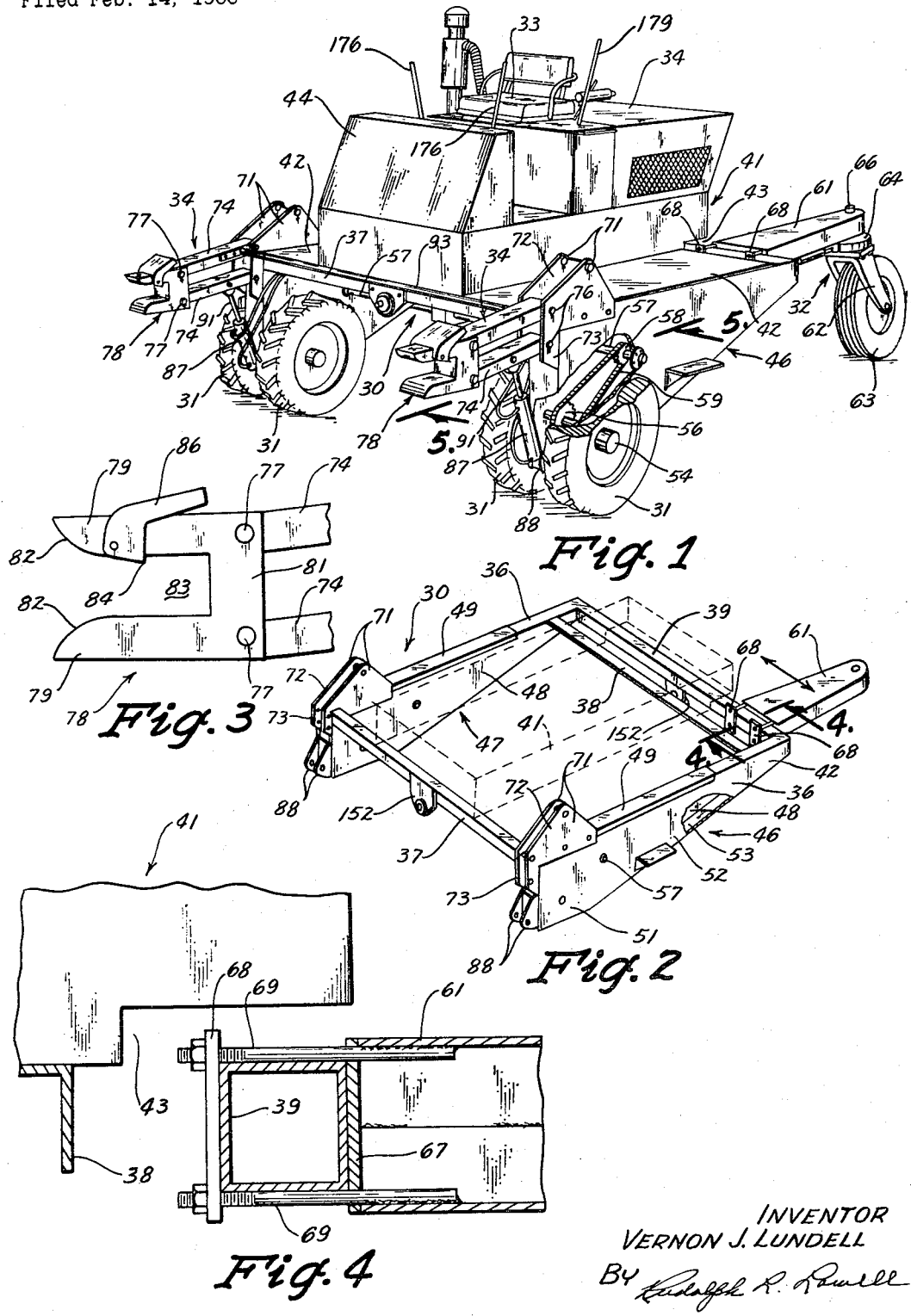
INVENTOR
VERNON J. LUNDELL
BY
ATTORNEY

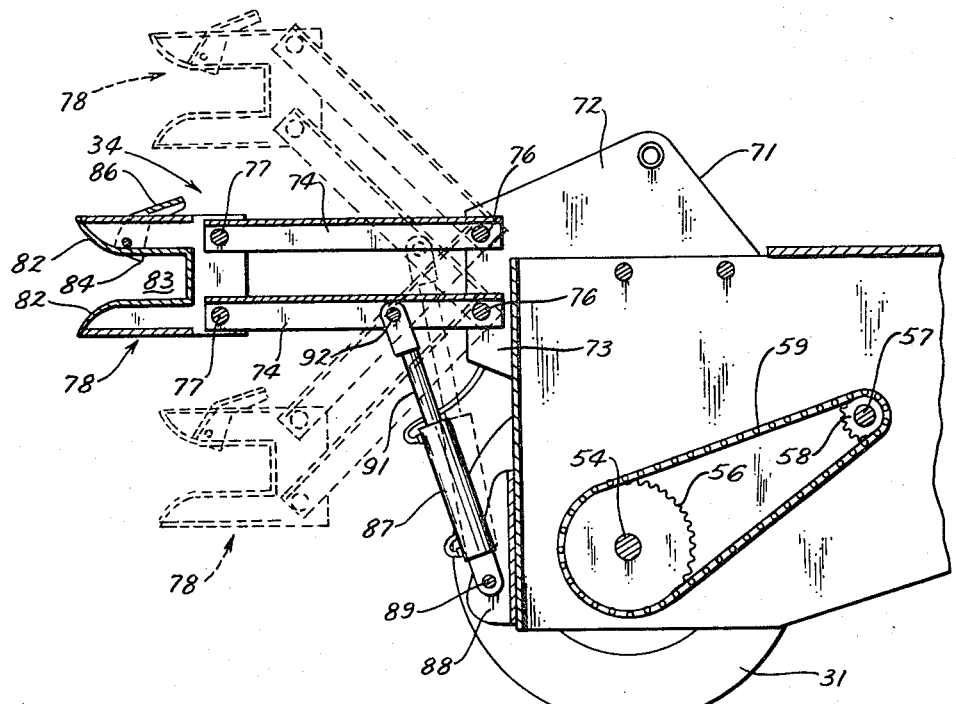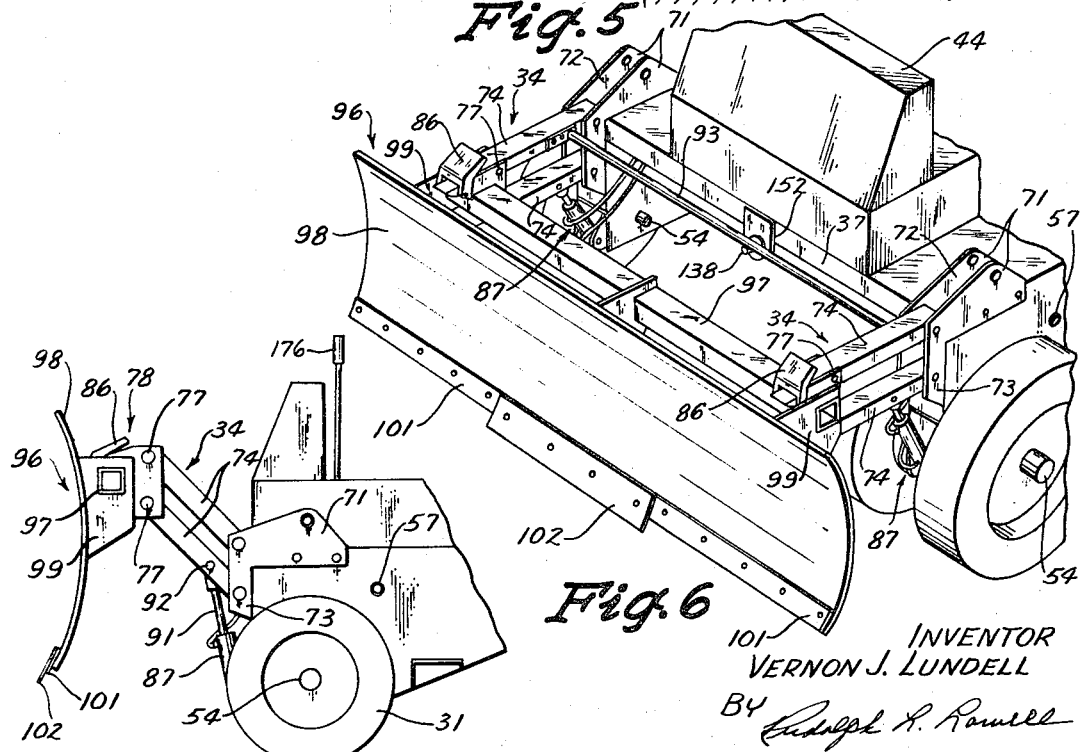

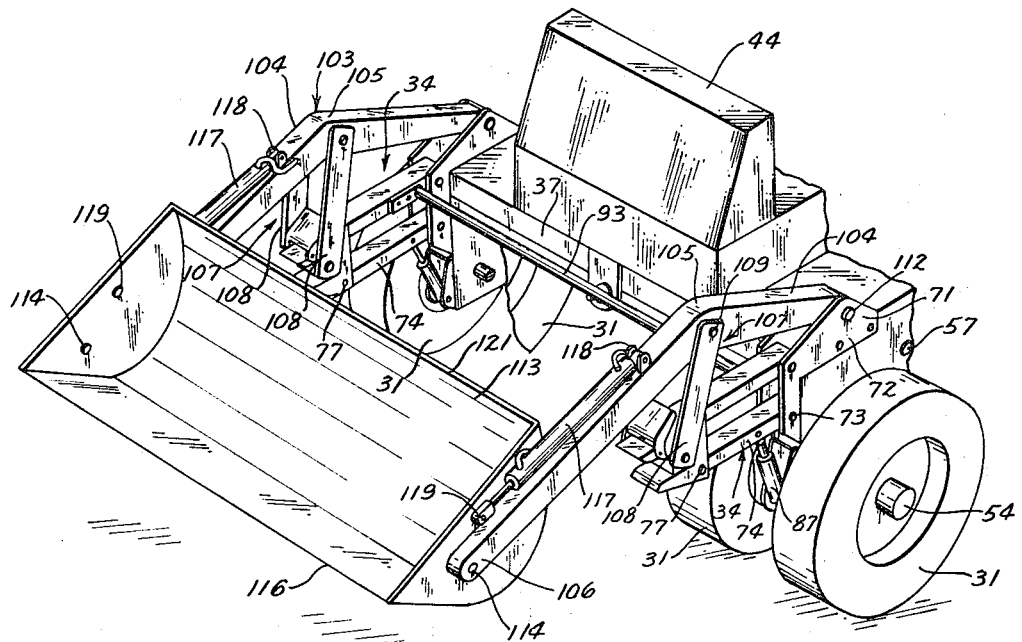
Fig. 8
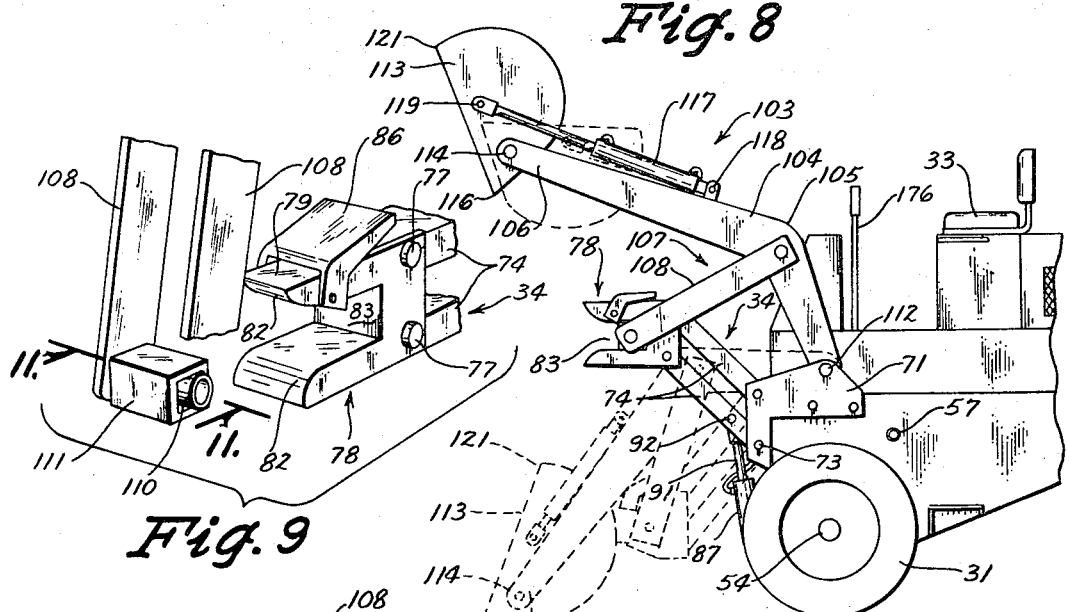
Fig. 9
Fig. 10
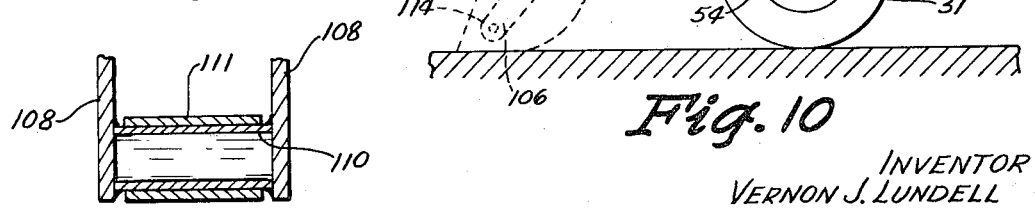
Fig. 11
INVENTOR
VERNON J. LUNDELL
BY Rudolph L. Lowell
ATTORNEY

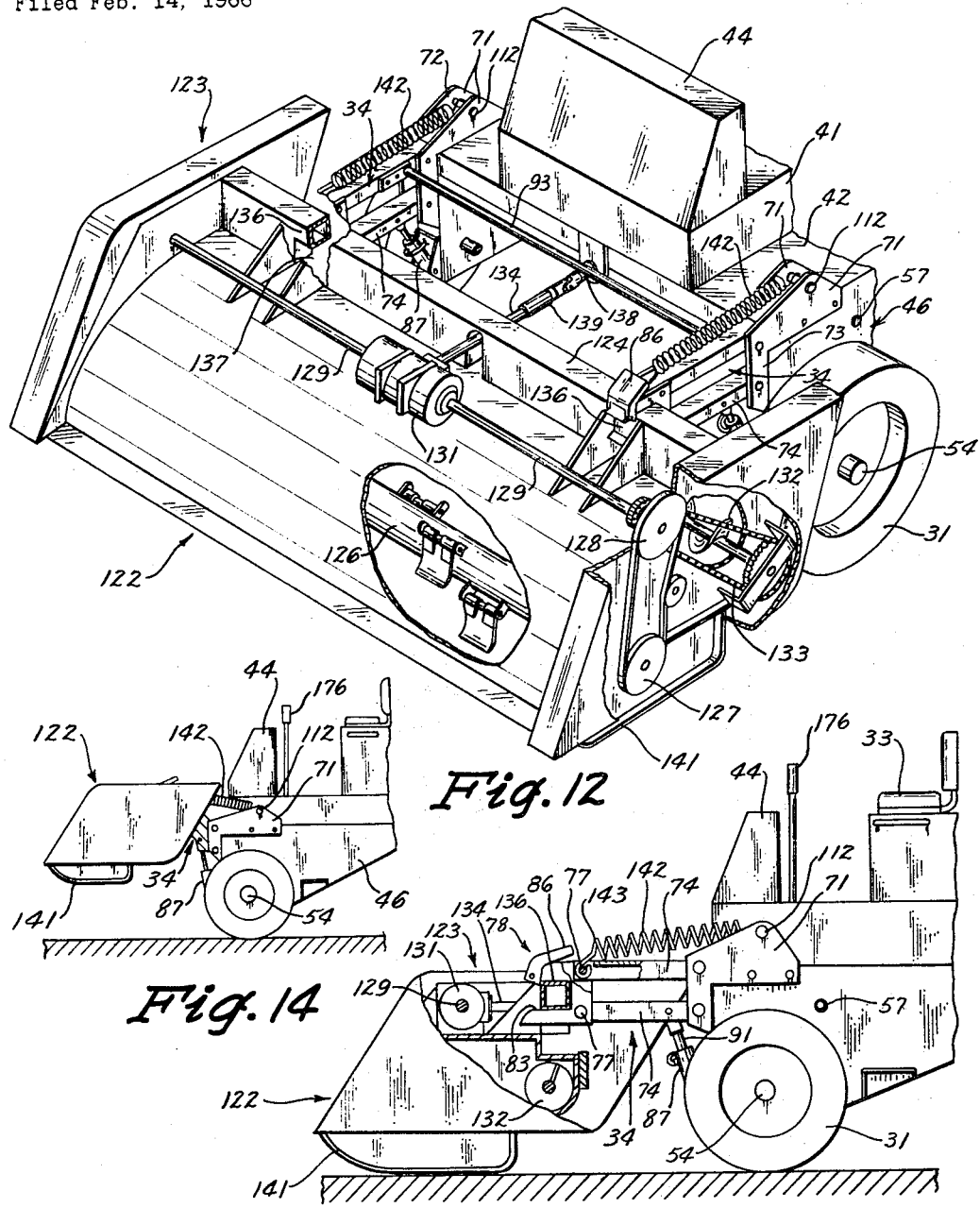

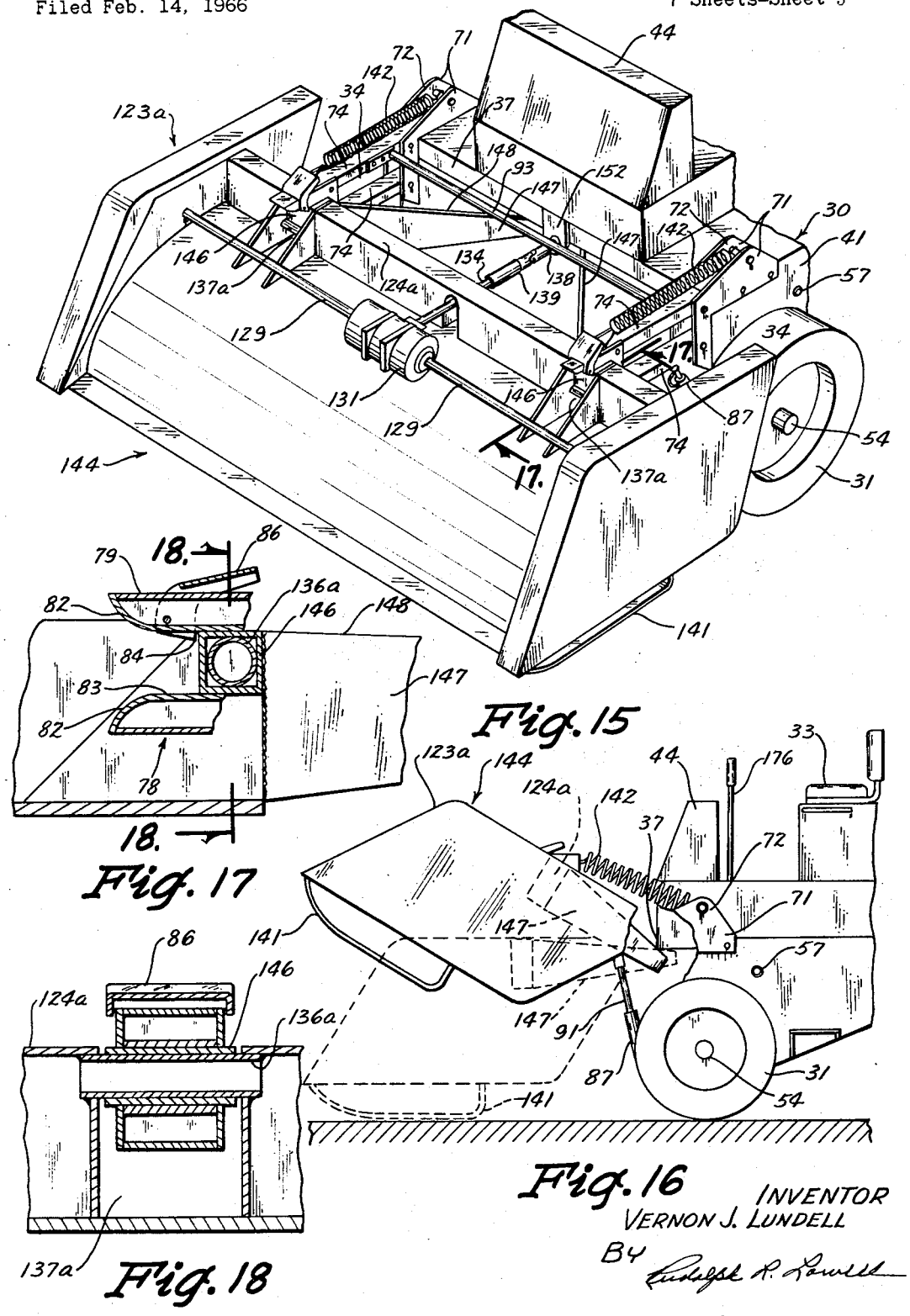

Oct. 1, 1968  V. J. LUNDELL  3,403,802
FARM TRACTOR

Filed Feb. 14, 1966  7 Sheets-Sheet 6

INVENTOR
VERNON J. LUNDELL
BY
*Rudolph L. Lowell*
ATTORNEY

Oct. 1, 1968 V. J. LUNDELL 3,403,802
FARM TRACTOR
Filed Feb. 14, 1966 7 Sheets-Sheet 7

INVENTOR
VERNON J. LUNDELL
BY
ATTORNEY

United States Patent Office 3,403,802
Patented Oct. 1, 1968

3,403,802
FARM TRACTOR
Vernon J. Lundell, Cherokee, Iowa 51012
Filed Feb. 14, 1966, Ser. No. 527,128
8 Claims. (Cl. 214—778)

ABSTRACT OF THE DISCLOSURE

The tractor includes a main frame having a front wheel drive, a rear mounted engine and a forwardly carried operator's seat. A pair of hydraulically operated pivoted lift arm structures projected forwardly from opposite sides of the tractor have rear ends pivotally supported at the front end of the tractor for up and down pivotal movement of their front ends. A farm implement is releasably connected to the front ends of the arm structures for movement to raised and lowered positions forwardly of the tractor. The farm implement is thus in the direct line of vision of the tractor operator and acts also to increase the tractive effort of the front drive wheels. The arm structures are spring biased in an upward direction to floatingly support the farm implement in a lowered ground engaging position. A torsion bar connected between the arm structures adjacent their pivoted rear ends functions to permit relative pivotal movement between the arm structures to facilitate their connection with a farm implement and to stabilize the arm structures against such relative movement when the implement is in a supported position on the arm structures.

This invention relates generally to farm tractors and in particular to a farm tractor having a front wheel drive and front mounted forwardly projected linkage structures adapted for releasable connection with a plurality of farm implements or working attachments to support a connected implement for pivotal up and down movement at a position forwardly of the tractor.

An object of this invention is to provide an improved farm tractor.

A further object of this invention is to provide a farm tractor equipped with a pair of front mounted parallel linkage structures having connections thereon coacting with connections on different type farm implements so that an implement can be readily interchanged relative to the tractor by one man.

Another object of this invention is to provide a tractor having a rear mounted power unit, a front operator's seat, and front drive traction wheels wherein linkage arms pivotally supported on the tractor and projected forwardly therefrom are connectable with a farm tractor whereby to position the implement in the direct line of vision of the tractor operator and to increase the tractive effort of the drive wheels.

Still another object of this invention is to provide a farm tractor having front drive traction and steering wheels and means for supporting a farm implement forwardly thereon wherein a rear mounted caster wheel assembly is adjustable transversely of the tractor to an adjusted position determined by the field operation to be performed by the tractor.

A further object of this invention is to provide a farm tractor with a frame unit having a pair of transversely depending sections at the front end thereof for rotatably supporting traction wheels wherein linkage structures projected forwardly of the tractor and capable of mounting a farm implement thereon are pivotally connected adjacent the upper ends of the depending sections. An upright hydraulic cylinder assembly is extended between and connected to each linkage structure and the lower end of a side section to pivotally raise and lower the front end of the linkage structures which are connected together by a transverse torsion bar which maintains the linkage structures against relative pivotal movement on actuation thereof by the hydraulic cylinder assemblies.

Still another object of this invention is to provide a farm tractor having a pair of pivoted linkage structures projected forwardly therefrom for supporting a farm implement wherein a longitudinally extended power shaft has a power take-off section accessible at the front of the tractor for direct drivable connection with any working mechanism on the implement requiring power for its operation.

A further object of this invention is to provide a farm tractor having pivoted linkage arms projected forwardly therefrom for supporting a ground engageable farm implement and operated by hydraulic cylinder assemblies to raise and lower the implement into and out of a ground engaging position, wherein the forward ends of the linkage arms are yieldably connected to the tractor to floatingly support the implement for travel along the ground when the hydraulic cylinder assemblies are retracted.

Yet another object of this invention is to provide a farm tractor having a pair of front steering and driving wheels and a rear caster wheel assembly rotatable about a vertical axis wherein a braking mechanism for applying a braking action against such rotation of the caster wheel assembly is operable to release the braking action on the caster wheel assembly during a steering operation and to apply the braking action when the tractor is traveling forwardly in a linear path.

Another object of this invention is to provide a farm tractor having a frame unit with a pair of depending front traction wheels and a depending rear caster wheel wherein the wheels are demountable from the frame unit for remounting at the lower ends of leg members, the upper ends of which are detachably connected to the frame unit at the same relative positions previously occupied by the wheels whereby to convert the tractor from use for normal low field operations such as hay cutting, cultivating, plowing and the like, to use for high field operations such as plant spraying.

Still a further object of this invention is to provide a farm tractor having a pair of forwardly projected rearwardly pivoted linkage structures operated hydraulically to pivotally raise and lower the front ends thereof, wherein a loader attachment having a pair of boom members overlying the linkage structures and pivoted on the tractor rearwardly of the linkage structures with the front ends therreof projected forwardly of the linkage structures are connectable with the linkage structures to provide for a progressive accelerated movement of such front ends during upward pivotal movement from lower to upper positions therefor. A scoop is pivotally supported between the front ends of the boom members adjacent the forward side thereof so that when the scoop rear side is moved upwardly and forwardly to a scoop unloading position the scoop front side projects only a short distance below the front ends of the boom members whereby a maximum clearance is provided with the box of a wagon, spreader or the like being filled.

Yet another object of this invention is to provide a farm tractor which is highly maneuverable, economical in cost and efficient in operation to support and operate farm implements where their operation is always under the observation of the tractor operator and wherein different type implements are readily interchangeable with the tractor by one man so as to appreciably increase the availability of the tractor for different farm operations.

Further objects, features and advantages of this invention will become apparent from the following description when taken in connection with the accompanying drawing wherein:

FIG. 1 is a front perspective view of the farm tractor of this invention;

FIG. 2 is a perspective view of the frame unit for the farm tractor shown in FIG. 1;

FIG. 3 is an enlarged elevational detail view of the front end of an implement supporting link structure shown in FIG. 1;

FIG. 4 is an enlarged sectional detail view taken on the line 4—4 in FIG. 2;

FIG. 5 is an enlarged sectional view as seen along line 5—5 in FIG. 1 and illustrating changed positions of the implement supporting link structure;

FIG. 6 is a perspective view of the front end of the farm tractor of FIG. 1 shown in assembly relation with a bulldozer attachment;

FIG. 7 is a reduced side elevational view of the assembly in FIG. 6 showing the bulldozer blade in a raised position;

FIG. 8 is a perspective view of the front end of the farm tractor of FIG. 1 shown in assembly relation with a loader attachment;

FIG. 9 is an enlarged exploded perspective view showing the connection of the loader attachment with the front ends of the linkage structures;

FIG. 10 is a side view of the assembly of FIG. 8 showing the loader attachment and the dump bucket or scoop therefor in changed positions;

FIG. 11 is an enlarged detail sectional view taken along the line 11—11 in FIG. 9;

FIG. 12 is a perspective view of the front end of the farm tractor shown in assembly relation with a windrower attachment with portions being broken away for clarity;

FIG. 13 is a reduced side elevational view of the assembly in FIG. 12 with some parts broken away and other parts shown in section to more clearly illustrate the assembly;

FIG. 14 is a view illustrated similarly to FIG. 13 showing the windrower attachment in an elevated position;

FIG. 15 is a view similar to the assembly of FIG. 12 showing a modified form of the windrower attachment;

FIG. 16 is a side elevational view of the assembly in FIG. 15 with some parts broken away and other parts in section showing the windrower attachment in raised and lowered positions therefor.

FIG. 17 is an enlarged sectional detail view taken along the line 17—17 in FIG. 15;

FIG. 18 is an enlarged sectional detail view as seen on the line 18—18 in FIG. 17;

Figure 19:
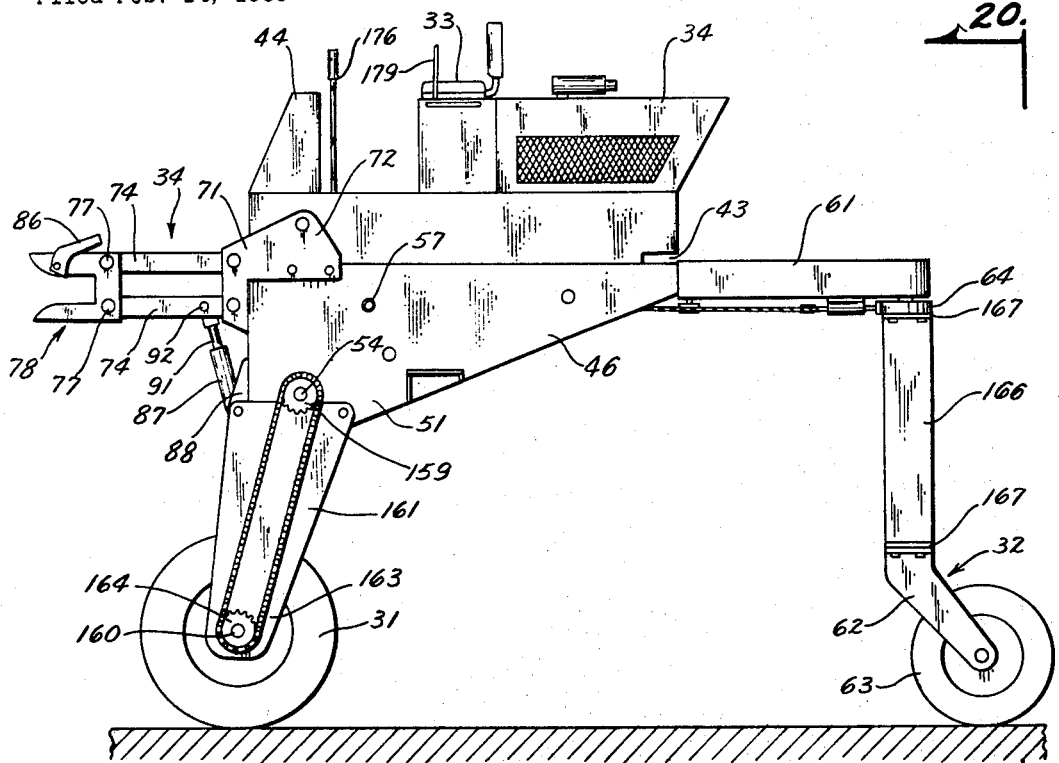
FIG. 19 is a side elevational view of the farm tractor of this invention illustrated in assembly relation with wheel support extension to convert the tractor for use in high field operations.

With reference to the drawing the farm tractor of this invention is illustrated in FIG. 1 as including a main frame 30, a pair of transversely spaced dual front wheels 31, a rear caster wheel unit 32, a front operator seat 33 and an engine compartment 34 located rearwardly of the seat 33. Projected forwardly of the tractor and corresponding to each pair of dual wheels 31 are a pair of pivoted lift arms or linkage structures 34 for supporting a farm implement (not shown) at a position forwardly of the tractor and in full view of the tractor operator.

The main frame 30 (FIGS. 1 and 2) is flat and of a substantially square shape in top plan view and includes a pair of side frame members 36 interconnected by a front transverse member 37 and a pair of longitudinally spaced rear transverse members 38 and 39. A box frame 41 formed of flat upright side members and of a substantially rectangular shape is extended longitudinally of the main frame unit 30 at a transversely centered relation thereon so as to be spaced inwardly from the side frame members 36. The spaces thus formed are covered by plate members 42 which constitute walking platforms to each side of the box frame 41.

As best appears in FIG. 2 the box frame 41 is supported on the transverse members 37 and 38 and is cut away as indicated at 43 (FIGS. 1 and 4) so as to be in clearance relation with the rear transverse member 39 for a purpose to appear later. The operator seat 33, the tractor power unit 40 (FIG. 22) and the engine compartment 34 (FIG. 1) are carried on the box frame 41 as is also a dashboard structure 44 located forwardly of the seat 33.

The main frame 30 is formed with a pair of transversely spaced oppositely arranged depending side sections 46 and 47 for supporting the linkage structures 34 and pairs of dual wheels 31 at opposite front corners of the frame 30. Since each depending side section 46 and 47 is similar in construction and similarly assembled with the frame 30 and corresponding link structure and dual wheels only the side section 46 will be described in detail with like numerals being applied to like parts.

The side section 46 (FIGS. 1 and 2) is comprised of a pair of like plate members 48 of a substantially right triangular shape arranged upright in a parallel spaced side-by-side relation with the base portions 49 upwardly and the apex portions 51 located forwardly below the front corners of the main frame 30. The hypotenuse portions 52 are connected together rearwardly of the apex portions 51 by a plate member 53 best shown in FIG. 2. The plate members 48 are coextensive in length with a main frame side member 36.

In the assembly of the side section 46 with the main frame 30 the base portions 49 are arranged in a straddling relation with a side frame member 36 to a position flush with the upper surface of the frame member 36. These base portions 49 are secured to a frame member 36 by welding and/or bolting. As a result the side section 46 is of a rigid box or tubular construction formed by the plate members 48, the bottom plate member 53 and a side frame member 36.

The dual wheels 31 (FIG. 1) are arranged at opposite sides of the side section 46 and mounted on a shaft 54 rotatably supported in the apex portions 51 of the plate members 48. A sprocket gear 56 fixed on the shaft 54 is positioned between the apex portions 51 of the side section 46. Extended transversely of the main frame 30 with its opposite ends projected through and rotatably supported on the side sections 46 and 47 is a power shaft 57. A sprocket gear 58 mounted on the power shaft 57 and located within the side section 46 is connected with the wheel gear 56 by a chain 59 for driving the front wheels 31.

The rear caster wheel unit 32 is carried in a trailing relation from the main frame 30 (FIG. 1) by an elongated box frame structure 61. A fork member 62 for rotatably supporting a caster wheel 63 is detachably secured to a brake drum or pulley member 64 for a purpose to be hereinafter described. The brake drum 64 has an axial king bolt or shaft 66 projected upwardly therefrom for rotatable support within and adjacent the rear end of the box frame 61.

The front end of the box frame 61 (FIGS. 2 and 4) has a cover plate 67 adapted to fit against the back side of the rear transverse member 39 of the main frame 30. The plate 67 functions as part of a clamp means which includes a pair of plate members 68 positionable against the front side of the rear transverse member 39 and connectable with the plate 67 through clamp bolts 69. Thus when the bolts 69 are loosened the caster wheel unit 32 and box frame 61 are adjustable together along the rear frame member 39 within the transverse confines of the main frame 30 and are maintained in an adjusted position on clamping of the bolts 69. Full adjustment transversely of the frame 30 is permitted by the cut away portion 43 in the box frame 41 with adjustment of the caster wheel unit 32 to an adjusted position being determined by the field operation to be performed by the tractor.

Each implement supporting linkage structure 34 (FIGS. 1 and 2) includes a pair of flat upright mounting plates or brackets 71. Each bracket 71 has a substantially triangularly shaped body member 72 formed with a forward depending leg 73. In assembly the brackets 71 are arranged to opposite sides of a side section 46 and 47 so as to partially overlie the upper front corners thereof. The overlying portions of the body members 72 of the brackets 71 are suitably secured to corresponding ones of the plate members 48 by welding and/or bolting. As a result the depending legs 73 project forwardly in a transversely spaced relation from a side section 46 and 47 with the body members 72 projected upwardly from a side section and from the main frame 30.

A pair of arm members 74 of a channel shape and facing downwardly have their rear ends extended between and pivotally connected at 76 in a vertically spaced relation to the legs 73 of the brackets 71. The forward ends of the arms 74 are pivotally connected at 77 in a vertically spaced relation to an implement connecting unit 78. There is thus formed a parallel link system comprised of the arms 74, the leg portions 73 and the connecting unit 78. Thus on up and down pivotal movement of the arms 74 the connecting unit 78 is maintained in a horizontal position as shown in FIG. 5.

Referring to FIG. 3 it is seen that the connecting unit 78 is of a generally U-shape opening forwardly with its legs 79 vertically spaced and with the arm pivots 77 located in the base portion 81 thereof. The adjacent facing surfaces of the legs 79 are tapered at their forward ends as indicated at 82 to function as guides in directing a coacting connecting unit on a farm implement within the pocket or socket 83 formed by the base portion 81 and the rear end sections of the legs 79. A catch 84 for a latch 86 pivoted on a connecting unit 78 defines the forward extent of the receiving pocket 83.

The linkage structures 34 are pivotally raised and lowered by corresponding hydraulic cylinder and piston assemblies 87. A U-shape bracket 88 (FIGS. 2 and 5) is secured adjacent the lower end of each of the side sections 46 and 47 with the legs thereof extended forwardly. The cylinder of an assembly 87 is pivotally connected at 89 between the legs of a bracket 88 at a position below the level of the wheel shaft 54. The piston rod 91 of an assembly 87 is pivotally connected at 92 to the lower one of the arms 74 of a linkage structure 34. Fluid under pressure is supplied to the cylinder assemblies 87 from a pump and reservoir unit 93 (FIG. 22) carried on the frame 30 and operable from the tractor engine 40.

With a farm implement supported on the connecting units 78 of the linkage structures 34 it is apparent that the load applications on the cylinder assemblies 87 may vary so as to effect a non-uniform or delayed lifting action of one of the hydraulic cylinder assemblies relative to the other one thereof. To prevent this condition there is provided a transverse torsion bar 93 (FIG. 1) extended between and rigidly connected to the upper ones of the arms 74 of the linkage structures 34. This torsion bar 93 acts to maintain the linkage structures 34 against relative pivotal movement as they are raised and lowered by the hydraulic cylinder assemblies 87.

With reference to FIGS. 6 and 7 the linkage structures 34 are illustrated in assembly relation with a bulldozer attachment indicated generally at 96 and including a transverse tubular mounting bar 97 for a blade 98.

The bar 97 is of a size and shape in transverse cross section corresponding to that of the receiving pocket 83 in a connecting unit 78 so as to be receivable therein in a mating relation. On insertion of the opposite ends of the bar 97 between the legs 79 of the connecting units 78 the pivoted latches 86 are moved upwardly to release the catch portions 84 thereof. When the ends of the mounting bar 97 are within the receiving pockets 83 the latches 86 are moved downwardly under the action of gravity whereby the catches 84 are engageable with the mounting bar 97 to prevent forward movement thereof out of the pockets 83.

The mounting bar 97 is thus supported on and connected with the connecting units 78 against relative turning or rotational movement so that the bulldozer attachment 96 is held in a horizontal position for all moved positions of the linkage structures 34, as illustrated for the uppermost positions thereof in FIG. 7. Movement of the mounting bar 97 transversely of the linkage structures 34 is prevented by combination stop and mounting plates 99 connected between the rear side of the blade 98 and the mounting bar 97 whereby a plate 99 is engageable with an outer side of a connecting unit 78.

The blade 98 has a usual cutting plate or knife 101 secured thereto and additionally carries a centrally located auxiliary blade 102 which extends below the level of the primary or usual blade 101. It has been found that use of the auxiliary blade 102 provides for a greater earth moving capacity with less tractive effort relative to the use of the usual cutting plate 101 alone.

FIGS. 8 and 9 illustrate the linkage structures 34 in assembly relation with a tractor loader attachment designated generally at 103. The attachment includes a pair of oppositely arranged boom members 104 of an angulate shape having apex portions 105 faced upwardly and located remotely from the front ends 106 of the boom members 104.

Each boom member 104 is provided with a connecting link unit 107 which includes a pair of links 108 arranged at opposite sides of a boom member 104 and pivotally connected thereto at one of their ends to the apex portion 105. The other ends of the links 108 (FIG. 9) are connected together by a tubular shaft 110. Positioned between the links 108 and rotatably mounted on the shaft 110 is a tubular connecting block 111 of a size and shape in transverse section corresponding to the receiving pocket 83 in a connecting unit 78.

In the assembly of the loader attachment 103 with the farm tractor the rear ends of the boom members 104 are positioned between corresponding bracket plates 71 for pivotal connection thereto at 112 (FIGS. 8 and 10). The boom members 104 are transversely spaced a distance apart corresponding to the transverse spacing between the link structures 34 so as to overlie the link structures with the front ends 106 thereof spaced forwardly from the link structures.

The connecting blocks 111 are then positioned within corresponding pockets 83 of the connecting units 78 in which they are held against rotational movement with the arms 108 in a straddling relation with a corresponding connecting unit 78.

Thus on actuation of the boom members 104 by the link structures 34 the boom members 104 are pivotally moved relative to their rear end pivots 112, with the arms 108 being pivotally movable relative to both the boom members 104 and the connecting units 78. By virtue of this construction of the loader attachment 103 and its assembly with the link structures 34 the front ends 106 of the boom members 104 are movable from positions adjacent the ground surface to positions above the level of the tractor and with this movement being progressively accelerated by the action of the arms 108.

A scoop or loading bucket 113 is extended transversely between the front ends 106 of the boom members 104 and is pivotally secured thereto at 114 adjacent its forward side 116 for pivotal movement about a transverse axis. A hydraulic cylinder assembly 117 (FIGS. 8 and 10) corresponding to each boom member 104 is extended longitudinally of a boom member along the top side thereof. The rear end of a hydraulic cylinder assembly 117 is pivoted to a boom member at 118 with its front end pivoted at 119 to the scoop 113 at a position rearwardly of the pivots 114 when the scoop 113 is in a loading position.

To be unloaded the rear side 121 of the scoop 113 is moved upwardly and forwardly whereby the scoop front side 116, when the scoop is in an unloading position, extends only a small distance below the front ends 106 of the boom members 104. As a result of this dumping action of the scoop 113 it is seen that a maximum clearance relation is provided between the scoop 113 and the box of a truck or manure spreader which is to be filled.

FIGS. 12-14 illustrate the assembly of the linkage structures 34 with a windrower attachment designated generally as 122 and including a frame unit 123 having a rear transverse frame member 124 of a tubular construction. A rotatable crop engaging means 126 extended transversely of the frame 123 has pulleys 127 (only one of which is shown) mounted at opposite ends thereof in belt connection with corresponding pulleys 128 carried on transverse shafts 129 in drivable connection with a gear unit 131. A collecting and feed auger 132 for receiving material from the crop engaging means 126 is driven from a shaft 129 through a sprocket gear and chain assembly 133. Projected rearwardly from the gear unit 131 and through the frame member 124 is a connecting shaft 134.

The rear transverse frame member 124 is formed with a pair of longitudinally spaced reduced sections 136 that are spaced upwardly from the lower side of the member 124 to form openings 137. The spacing between the reduced sections 136 corresponds to the transverse spacing between the connecting units 78 of the link structures 34 with each section 126 being of a size and shape in transverse section for reception in a mating relation within a pocket 83 of a connecting unit 78.

In the assembly of the attachment 122 with the link structures 34 the reduced sections 136 are positioned within the pockets 83 of the corresponding connecting units 78 against rotational movement. The latches 86 hold the sections 136 against forward movement out of the pockets 83 and the portions of the rear transverse member 124 defining the upright side walls of the openings 137 function as stops relative to the connecting units 78 to hold the frame member 124 against movement transversely of the link structures 34.

A front power take-off 138 on the tractor is attached to the rear end of the connecting shaft 134 through a telescopic shaft and universal joint connection indicated generally at 139.

Figure 21:
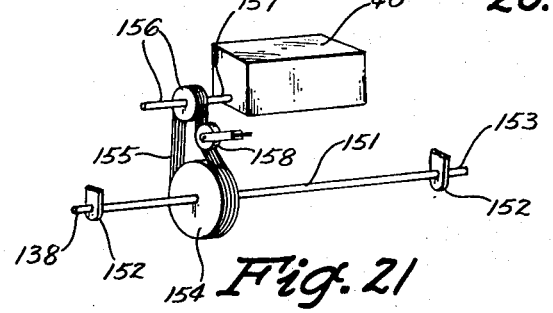
FIG. 21 is a diagrammatic perspective view of a power take-off shaft assembly which forms part of the power transmission system for the farm tractor of this invention.

As shown in FIG. 21 a power take-off shaft 151 extended longitudinally of the tractor is rotatably supported in bearings 152 supported from the main frame 30 and is of a length such that the front power take-off portion 138 projects forwardly from the tractor and a rear power take-off portion 153 rearwardly from the tractor. A belt pulley 154 mounted on the shaft 151 is connected by a belt 155 with a pulley 156 mounted directly on the drive shaft 157 of the tractor engine or power unit 40. A clutch unit 158 of a usual idler pulley type is engageable with the belt 155 to remove and apply a tension therewhereby to control the operation of the shaft 151 from the power unit 40.

On actuation of the link structures 34 in response to the operation of the hydraulic cylinder assemblies 87 the windrower attachment 122 is raised and lowered while in a horizontal position into and out of a ground engaging position as illustrated in FIGS. 13 and 14. Sleds or runners 141 are provided for traveling engagement of the attachment with the ground when the cylinder assemblies are in retracted positions.

To keep the full weight of the attachment from being applied to the ground and to eliminate consequent jars or shocks being applied to the link structures 34 as a result of the travel of the attachment over an uneven ground surface the weight of the attachment is counterbalanced by tension coil springs 142. The forward end 143 of a spring 142 is attached to the forward pivot 77 of the upper arm 74 of a link structure 34. The rear end of a spring 142 is attached to a pivot 112 on the mounting plates 71. Each spring 142 therefore is extended longitudinally in an overlying relation with a corresponding link structure 34 to exert a yieldable upwardly directed force thereon whereby to counteract the weight of the attachment on the link structures 34. As a result with the hydraulic cylinder assemblies 87 retracted and the runners 141 in ground engagement, the attachment is floatingly supported in its travel along the ground surface.

In FIGS. 15-18 there is illustrated a modified form of the windrower attachment 122 assembled with the link structures 34. The modified attachment is designated at 144 with similar reference numerals being applied to like corresponding parts previously described in connection with the windrower attachment 122 shown in FIGS. 12-14.

The attachment 144 (FIGS. 15-18) includes a frame unit 123a having a transverse rear frame member 124a formed with longitudinally spaced transverse sections 136a and openings 137a therebelow as best appears in FIG. 18. The sections 136a (FIG. 17) are of a circular shape in transverse cross section and are spaced apart a distance corresponding to the spacing between the link structures 34.

Connecting blocks 146 are rotatably mounted on the reduced sections 136a with each block 146 being of a size and shape in transverse cross section for reception in a mating relation within a corresponding pocket 83 of a connecting unit 78 of a link structure 34.

A pair of upright brace plates 147 (FIG. 15) are secured to and extend in a rearwardly converging relation from the rear transverse frame member 124a. The forward ends of the brace plates 147 are located adjacent the inner ends of corresponding reduced sections 136a with the top edges 148 of the plates 147 being tapered or sloped in a rearward and downward direction.

In the assembly of the windrower attachment 144 with the link structures 34 the connecting blocks 146 are positioned within corresponding receiving pockets 83 of the connecting units 78 in which they are held against rotational movement. When the blocks 146 are connected with the link structures 34 the rear ends of the brace plates 147 extend below the front transverse member 37 of the main frame 30 with the top edges 148 thereof in slidable bearing engagement with the under side of the frame member 37. The front power take-off 138 is then connected with the connecting shaft 134 by the connecting means 139.

It is seen therefore that the attachment 144 is pivotally supported at the connecting units 78 of the link structures 34 for up and down pivotal movement relative to the link structures 34, with the downward pivotal movement thereof at any moved position of the structures 34 being limited by the engagement of the brace plates 147 with front frame member 37.

As shown in FIG. 16 when the cylinder assemblies 87 are retracted and the attachment 144 is horizontally disposed with the runners 141 thereof in ground engagement, the frame member 37 is engaged by the top edges 148 of the plates 147 adjacent the rear ends of the plates 147. Pivoted downward movement of the attachment 144 below such horizontally disposed position is permitted by the tapered edges 148 providing for a downward movement of the plates 147 relative to the frame member 37. In other words the engagement of the plates 147 with the frame member 37 constitutes a movable or slidable fulcrum point acting to yieldably restrain downward movement of the attachment 144. Combined with the action of the springs 142 there is thus provided what may be termed a double floating support for the attachment 144 in its travel in contact engagement with the ground surface.

When the link structures 34 are elevated the fulcrum action of the plates 147 relative to the frame member 37 provides for an elevation of the attachment 144 to an uppermost position wherein it is tilted forwardly and upwardly so as to provide for the under side thereof being readily accessible for service and maintenance purposes.

Figure 20:
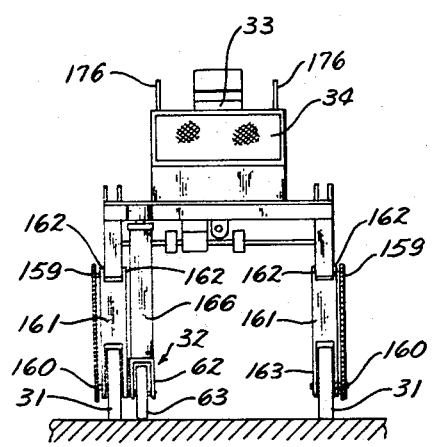
FIG. 20 is a reduced rear elevational view of the farm tractor in FIG. 19.

FIGS. 19 and 20 illustrate the ready adaption of the farm tractor of this invention from use for low field crop or soil working operations to use for high field working operations such as spraying and the like. To convert the tractor to what may be termed a high frame tractor the dual wheels 31 are removed from the side sections 46 and 47 and a sprocket gear 159 is mounted on each shaft 54 to the outside of a side section 46 and 47.

An upright extension or leg 161 for each side section 46 and 47 has a pair of spaced attachment ears 162 projected upwardly from the top end thereof. The bottom end section 163 of an extension 161 is of a forked or bifurcated construction.

In the assembly of a leg extension 161 with a side section 46 and 47 the attachment ears 162 are arranged in a straddling relation with the apex portions 51 for detachable securement thereto as by bolts or the like. A wheel 31 located within the forked bottom end section 163 of a leg extension 161 is mounted on a shaft 160 rotatably supported in the forks of the bottom section 163. A sprocket gear 164 mounted on the shaft 160 is chain connected to the gear 159 on the shaft 54 to complete the drive system for a wheel 31.

A third upright leg extension 166 is provided for the caster wheel unit 32. This extension is formed at its opposite ends with flanges 167. On removal of the fork member 62 and caster wheel 63 from the brake pulley 64, the flange 167 at the upper end of the extension 166 is detachably secured to the under side of the brake pulley or drum 64 for rotation therewith. In turn the flange 167 at the lower end of the leg extension 166 is detachably secured to the caster wheel fork member 62.

The frame 30 is thus supported at an elevated horizontally disposed position for high field working operations, with the single drive wheels 31 being adapted for travel in a clearance relation with rows of planted crops.

Figure 22:
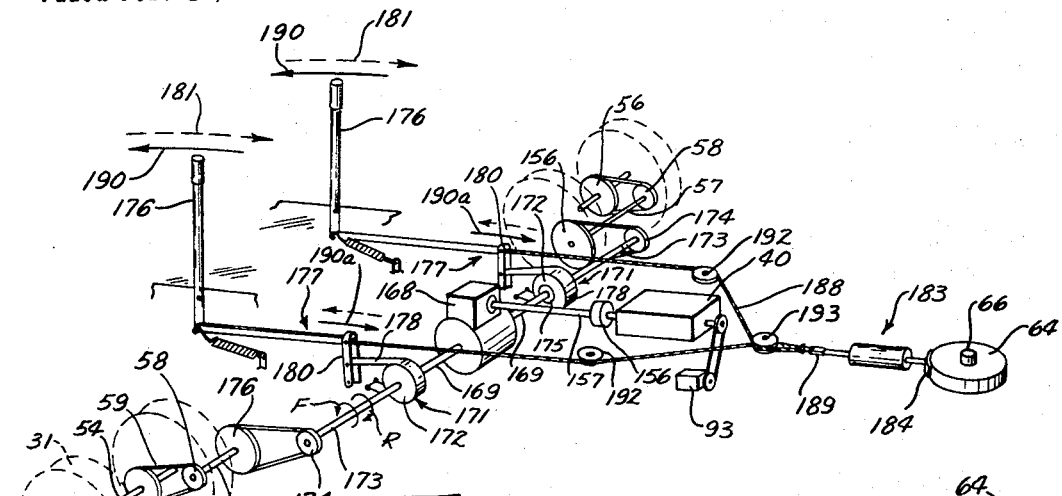
FIG. 22 is a diagrammatic perspective view of the power transmission system of the farm tractor shown in assembly relation with a braking system for the rear caster wheel assembly of the tractor.

The tractor power transmission system is diagrammatically illustrated in FIG. 22. The drive shaft 157 of the tractor engine 40 is connected to a gear unit 168 having transversely extended drive shafts 169 for applying power to the input side of planetary transmission units 171 having rotatable housings 172 and associated clutch mechanisms indicated generally at 175. The pulley 156 for driving the power take-off shaft 151 is mounted on the drive shaft 157 between the engine 40 and the gear unit 168.

Power output shafts 173 from the planetary transmission systems 171 carry gears 174 which are chain connected to gears 176 mounted on the shafts 57 that carry the sprocket gears 58, which as previously described, are connected by chains 59 to the front wheel drive gears 56.

The planetary power transmission systems 171 are controlled to vary the directional rotation of the drive wheels 31 by means including upright pivoted actuating levers 176 connected through linkage systems 177 with brake bands 178 operatively associated with the housings 172 of the planetary transmission systems 171. In this respect a housing functions as a brake drum relative to an associated brake band 178. Each linkage system 177 includes a pivoted actuator link 180 connected to a corresponding handle or lever 176 such that on pivoted movement of the lever 176 in one direction the actuator link 180 is pivotally moved in an opposite direction.

The rotational speed of the wheels 31 is controlled in the usual manner by regulation of the speed of the engine 40. The levers 176 as shown in FIGS. 1 and 19 are arranged in a transversely spaced relation between the operator's seat 33 and the dash structure 44 with a lever or handle 179 for actuating the power take-off clutch 158 being positioned to one side of the operator's seat 33.

When the levers 176 are in their neutral positions illustrated in FIG. 22, the clutch means 175 which are at the proper input sides of the planetary transmission systems 171 are released as are also the brake bands 178. To advance the tractor the levers 176 are moved forwardly from their neutral positions in the directions indicated by the arrows 190. In response to this forward movement of the levers 176 the actuator links 180 are pivoted rearwardly, in the directions indicated by the arrows 190a, to maintain the brake bands 178 in released positions along with engaging the clutch mechanisms 175 whereby to directly connect the shafts 169 with the shafts 173 to rotate the shafts 173 in the direction indicated by the arrows F.

To reverse the tractor the levers 176 are moved rearwardly from their neutral positions in the direction indicated by the arrows 181. In response to this rearward movement of the levers 176 the actuator links 180 are pivoted to apply the brake bands 178 on the housings 172 concurrently with releasing the clutch mechanisms 175. As a result the shafts 173 are driven by the shafts 169 through the planetary transmission systems 171 for reversed rotation as indicated by the arrows R.

In the steering of the tractor the levers 176 are manipulated to relatively control the rotation of the wheels 31. Thus for a left-hand turn of the tractor the left-hand lever 176 is moved to its neutral or reversing position, depending upon the turn being negotiated, while the right-hand lever 176 is advanced forwardly. Conversely for a right-hand turn the right-hand lever 176 is moved rearwardly while the left-hand lever 176 is advanced. This turning movement of the tractor is facilitated by the turning action of the caster wheel unit 32.

To provide for a free turning movement of the caster wheel unit 32 in response to turning movement of the front wheels 31 and to restrain the caster wheel unit 32 against fishtailing during a straight advance movement of the tractor the unit 32 is provided with a braking mechanism which includes the brake drum 64 and a coacting brake shoe 182. The release and application of the brake shoe 182 relative to the drum 64 is controlled by a hydraulic cylinder and piston assembly 183 (FIGS. 22 and 23) which is operated by the actuator links 180 in response to the pivotal movement of the levers 176.

The piston rod of the assembly 183 extends axially through its associated cylinder 185 and carries a disk shape piston 186 positioned within the cylinder and yieldably urged in a rearward direction by a spring 187. The brake shoe 182 is secured to the rear end of the piston rod 184. A cable 188 is connected intermediate the ends thereof to the front end of the piston rod 184 by a pulley connection 189. The cable ends 191 are attached to corresponding link actuators 180. From each of its ends 191 the cable is trained about pulleys 192 mounted on the main frame 30 and about a common pulley 193 mounted on the box frame 61 forwardly of and in linear alignment with the piston rod 184. The cable 188 is normally secured against movement relative to the pulley connection 189 by a cable clamp 194.

When both of the levers 176 are in their forwardly moved positions the brake shoe 182 applies a braking action on the brake drum 64. This braking action reduces any tendency of the caster wheel unit 32 to fishtail during a forward advance of the tractor. However if either or both of the levers 176 is pulled rearwardly beyond a centered neutral position therefor either one or both lengths of the cable will be moved forwardly to in turn move the brake shoe 182 out of braking engagement with the brake drum 64.

As a result in making a turn by pulling back on either lever 176 the brake drum 64 is released whereby the caster wheel unit 32 is freely rotatable to turn in response to the steering action of the front wheels 31.

Figure 23:
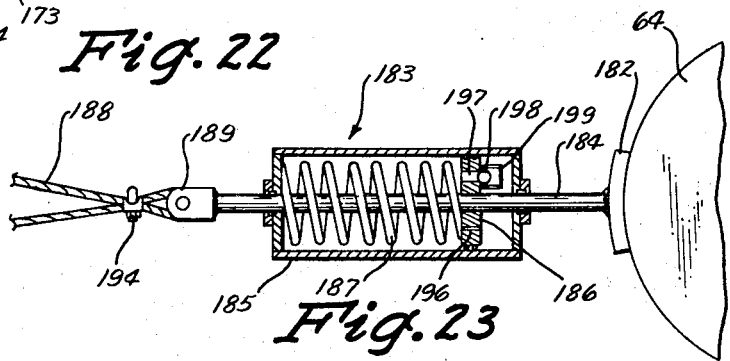
FIG. 23 is an enlarged detail sectional view of an actuating hydraulic cylinder assembly which forms part of the braking system shown generally in FIG. 22.
Figure 24:
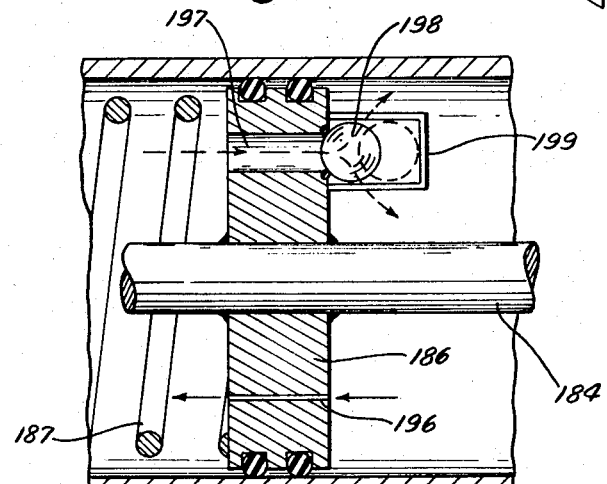
FIG. 24 is an enlarged fragmentary detail showing of a part of the brake actuating cylinder assembly shown in FIG. 23.

Referring to FIGS. 23 and 24 it is seen that the piston 186 is formed with a bleed hole 196 and a bypass hole 197, with the bypass hole 197 being of a much greater diameter than the bleed hole 196. On the side of the piston 186 opposite the spring 187 the bypass hole 197 is operatively associated with a ball type check valve 198 carried in a cage frame 199. On movement of the piston 186 forwardly in response to a rearward movement of a lever 176 from a neutral position therefor oil carried in the cylinder 185 is rapidly transferred through the bypass hole 197 in the direction indicated by the dash arrows in FIG. 24 from the spring side of the piston 186 to the opposite side thereof. The brake shoe 182 is thus immediately released from the brake drum 64 to permit a free rotation of the caster wheel unit 32 for tractor turning movement.

When a turn has been completed and the levers 176 are moved forwardly to advance the tractor the movement of the shoe 182 by the spring 187 into braking engagement with the drum 64 is delayed by virtue of the closing of the bypass hole 197 by the check valve 198 and the bleeding of oil to the spring side of the piston through the bleed hole 196 as indicated by the solid arrows in FIG. 24. As a result the caster wheel unit 32, after a turn has been negotiated, is freely rotatable for a time period providing for its movement into a straight trailing relation prior to the application of the brake shoe 182 on the brake drum 64.

As previously mentioned the box frame 61 which carries the caster wheel unit 32 is transversely adjustable relative to the main tractor frame 30. The braking mechanism is readily adapted to any adjusted position of the body frame 61. Thus on release of the cable clamp 194 the cable 188 is movable relative to the pulley connection 189. Thus on transverse adjustment of the box frame 61 the cable lengths to each side of the pulley connection 189 are automatically relatively varied. With the box frame 61 moved to an adjusted position it is only necessary to re-apply the cable clamp 194 to condition the braking mechanism for the caster wheel unit 32 for operation as above described.

Although the invention has been described with respect to a preferred embodiment thereof it is to be understood that it is not to be so limited since changes can be made therein within the full intended scope of the appended claims.

I claim:
1. A farm tractor for supporting a forwardly located working attachment for up and down pivotal movement including:
   (a) a frame unit having a front end portion,
   (b) ground engaging wheels for supporting said frame unit,
   (c) a pair of attachment supporting arm structures arranged at opposite sides of said front end portion and extended forwardly therefrom,
   (d) pivot means connecting the rear ends of said arm structures on said front end portion for up and down pivotal movement of the front ends thereof,
   (e) mounting means for the working attachment carried at the front ends of said arm structures and connectable with the working attachment,
   (f) a pair of hydraulic lift means corresponding to said arm structures for raising and lowering the front ends of said arm structures, each lift means extended between and connected to said front end portion and a corresponding one of said arm structures, and
   (g) a torsion bar extended between and connected to said arm structures forwardly of and adjacent said pivot means to provide for relative pivotal movement of said arm structures when the working attachment is being mounted hereon, and to maintain the arm structures against relative pivotal movement after the working attachment has been mounted thereon.

2. A farm tractor for supporting a forwardly located working attachment for up and down pivotal movement including:
   (a) a frame unit having a front end portion,
   (b) ground engaging wheels for supporting said frame unit,
   (c) a pair of attachment supporting arm structures arranged at opposite sides of said front end portion and extended forwardly therefrom,
   (d) pivot means connecting the rear ends of said arm structures on said front end portion for up and down pivotal movement of the front ends thereof,
   (e) mounting means for the working attachment carried at the front ends of said arm structures and connectable with the working attachment,
   (f) a pair of hydraulic lift means corresponding to said arm structures for raising and lowering the front ends of said arm structures, each lift means extended between and connected to said front end portion and a corresponding one of said arm structures, and
   (g) a pair of spring members corresponding to said arm structures, each spring member connected at one end adjacent the forward end of an arm structure with the opposite end thereof connected to the frame unit rearwardly of an arm structure, said spring members acting to floatingly support the attachment for travel in contact with a ground surface when said lift means are in lowered positions therefor.

3. A farm tractor for supporting a loader attachment on the front end thereof including:
   (a) a frame unit having a pair of transversely spaced depending sections at the front end thereof,
   (b) a pair of traction wheels corresponding to said depending sections and rotatably mounted adjacent the lower ends thereof,
   (c) a third wheel mounted at the rear end of said frame unit,
   (d) a pair of lift arms corresponding to said depending sections and extended forwardly therefrom,
   (e) means mounting the rear ends of said lift arms adjacent the upper ends of said depending sections for pivotal up and down movement of the forward ends thereof,
   (f) a pair of lift means corresponding to said lift arms, each lift means being connected at one end to a lift arm with the opposite end thereof mounted on a corresponding depending section adjacent the lower end thereof,
   (g) a pair of boom members for said attachment corresponding to said lift arms and extended longitudinally of the frame unit above a corresponding lift arm, each boom member being of an angulate shape longitudinally thereof with an apex portion faced upwardly and positioned adjacent the rear end of the boom member,
   (h) means pivotally supporting the rear end of each boom member on said frame unit rearwardly of a corresponding lift arm,
   (i) a lift member extended between a corresponding boom member and lift arm having one end pivotally connected to the apex portion of the boom member and the opposite end thereof pivotally connected to the front end of the lift arm, and
   (j) a scoop extended between and pivotally connected to the front ends of said boom members.

4. A farm tractor as defined in claim 3 wherein each of said lift means comprises:

(a) a hydraulic cylinder assembly, and
(b) a torsion bar extended between and connected to said lift arms to maintain the lift arms against relative pivotal movement.

5. A farm tractor for supporting a loader attachment on the front end thereof including:
(a) a frame unit having a pair of transversely spaced depending sections at the front end thereof,
(b) a pair of traction wheels corresponding to said depending sections and rotatably mounted adjacent the lower ends thereof,
(c) a third wheel mounted at the rear end of said frame unit,
(d) a pair of lift arms corresponding to said depending sections and extended forwardly therefrom,
(e) means mounting the rear ends of said lift arms adjacent the upper ends of said depending sections for pivotal up and down movement of the forward ends thereof,
(f) a pair of lift means corresponding to said lift arms, each lift means being connected at one end to a lift arm with the opposite end thereof mounted on a corresponding depending section adjacent the lower end thereof,
(g) a pair of boom members for said attachment corresponding to said lift arms and extended longitudinally of the frame unit above corresponding lift arms,
(h) means pivotally supporting the rear end of each boom member on said frame unit rearwardly of a corresponding lift arm,
(i) a lift member extended between a corresponding boom member and lift arm having one end pivotally connected to the boom member and the opposite end thereof piovtally connected to the front end of the lift arm,
(j) a scoop positioned between and pivotally connected adjacent the forward end thereof to the front ends of said boom members for pivotal movement about an axis extended transversely of said frame unit,
(k) a pair of hydraulic cylinder assemblies corresponding to said boom members, each hydraulic cylinder assembly extended longitudinally of a boom member along the upper side thereof and pivotally connected at the rear end thereof to a boom member, and
(l) means pivotally connecting the forward end of a hydraulic cylinder assembly to the scoop at a position spaced rearwardly from said transverse axis when the scoop is in a loading position, whereby the rear end of the scoop is pivotally movable upwardly and forwardly to a scoop unloading position.

6. A farm tractor for supporting and operating a forwardly located farm implement, having a rotatable driven member, for up and down pivotal movement including:
(a) a frame unit having a pair of transversely spaced depending sections at the front end thereof,
(b) ground engaging wheels for supporting said frame unit,
(c) a pair of implement supporting lift arms corresponding to said depending sections and extended forwardly therefrom,
(d) means pivotally connecting the rear ends of said lift arms adjacent the upper ends of said depending sections for up and down pivotal movement of the front ends thereof,
(e) a pair of hydraulic cylinder assemblies corresponding to said lift arms for raising and lowering the front ends of said lift arms, each cylinder assembly pivotally connected at one end adjacent the lower end of a depending section with the opposite end thereof pivotally connected to a corresponding lift arm,
(f) supporting means for the farm implement mounted at the front ends of said lift arms and connectable with the farm implement,
(g) said farm unit including a transverse frame member at the front end thereof,
(h) a pair of arm members on said implement extended rearwardly in a converging relation with the rear ends thereof in movable bearing engagement with the under side of said transverse frame member, and
(i) means on said implement coacting with said supporting means to support the attachment on said lift arms for pivotal movement about a transverse axis, with pivotal movement in one direction limited by the engagement of said arm members with said transverse frame member.

7. A farm tractor for supporting and operating a forwardly located farm implement, having a rotatable driven member, for up and down pivotal movement including:
(a) a frame unit having a pair of transversely spaced depending sections at the front end thereof,
(b) ground engaging wheels for supporting said frame unit,
(c) a pair of implement supporting lift arms corresponding to said depending sections and extended forwardly therefrom,
(d) means pivotally connecting the rear ends of said lift arms adjacent the upper ends of said depending sections for up and down pivotal movement of the front ends thereof,
(e) a pair of hydraulic cylinder assemblies corresponding to said lift arms for raising and lowering the front ends of said lift arms, each cylinder assembly pivotally connected at one end adjacent the lower end of a depending section with the opposite end thereof pivotally connected to a corresponding lift arm,
(f) supporting means for the farm implement mounted at the front ends of said lift arms and connectable with the farm implement,
(g) said farm unit including a transverse frame member at the front end thereof,
(h) a pair of arm members on said implement extended rearwardly in a converging relation with the rear ends thereof in movable bearing engagement with the under side of said transverse frame member,
(i) means on said implement coacting with said supporting means to support the attachment on said lift arms for pivotal movement about a transverse axis, with pivotal movement in one direction limited by the engagement of said arm members with said transverse frame member, and
(j) a pair of spring members corresponding to said lift arms, each spring connected at one end to the forward end of a lift arm with the opposite end thereof connected to the frame unit rearwardly of a lift arm, said spring members acting to floatingly support the attachment for travel in contact with the ground surface when said cylinder assemblies are in retracted positions therefor.

8. A farm tractor for supporting and operating a forwardly located farm implement, having a rotatable driven member, for up and down pivotal movement including:
(a) a frame unit having a pair of transversely spaced depending sections at the front end thereof,
(b) ground engaging wheels for supporting said frame unit,
(c) a pair of implement supporting lift arms corresponding to said depending sections and extended forwardly therefrom,
(d) means pivotally connecting the rear ends of said lift arms adjacent the upper ends of said depending sections for up and down pivotal movement of the front ends thereof,
(e) a pair of hydraulic cylinder assemblies corresponding to said lift arms for raising and lowering the front ends of said lift arms, each cylinder assembly pivotally connected at one end adjacent the lower end of a depending section with the opposite end thereof pivotally connected to a corresponding lift arm,
(f) supporting means for the farm implement mounted at the front ends of said lift arms and connectable with the farm implement,
(g) said farm unit including a transverse frame member at the front end thereof,
(h) a pair of arm members on said implement extended rearwardly in a converging relation with the rear ends thereof in movable bearing engagement with the under side of said transverse frame member,
(i) means on said implement coacting with said supporting means to support the attachment on said lift arms for pivotal movement about a transverse axis, with pivotal movement in one direction limited by the engagement of said arm members with said transverse frame member, and
(j) a torsion bar extended between and connected to said lift arms to maintain the lift arms against relative pivotal movement when the implement is supported thereon.

References Cited

UNITED STATES PATENTS

| 2,730,252 | 1/1956 | Oswald | 214—130 X |
| 3,212,243 | 10/1965 | Mark et al. | 56—24 X |
| 3,319,817 | 5/1967 | Juhl et al. | 214—778 |

FOREIGN PATENTS

| 850,904 | 9/1952 | Germany. |
| 54,757 | 6/1943 | Netherlands. |

HUGO O. SCHULZ, *Primary Examiner.*